United States Patent
Yao et al.

(10) Patent No.: US 12,307,298 B2
(45) Date of Patent: May 20, 2025

(54) TASK SCHEDULING BASED ON TASK TYPE USE LEVELS AND PRIORITY LEVELS

(71) Applicant: EMC IP Holding Company LLC, Hopkinton, MA (US)

(72) Inventors: Sicong Yao, Shanghai (CN); Xianlong Liu, Shanghai (CN); Jing Chen, Epping (AU); Jianhua Shao, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 517 days.

(21) Appl. No.: 17/742,568

(22) Filed: May 12, 2022

(65) Prior Publication Data

US 2023/0030857 A1 Feb. 2, 2023

(30) Foreign Application Priority Data

Jul. 23, 2021 (CN) .......................... 202110836316.4

(51) Int. Cl.
*G06F 9/50* (2006.01)

(52) U.S. Cl.
CPC .......... *G06F 9/5038* (2013.01); *G06F 9/5016* (2013.01); *G06F 9/505* (2013.01)

(58) Field of Classification Search
None
See application file for complete search history.

(56) References Cited

U.S. PATENT DOCUMENTS

| | | | | |
|---|---|---|---|---|
| 6,859,926 B1* | 2/2005 | Brenner | ................ | G06F 9/505 |
| | | | | 718/100 |
| 8,473,678 B1* | 6/2013 | Rajasekaran | ......... | G06F 3/0685 |
| | | | | 711/170 |
| 9,092,159 B1* | 7/2015 | Taylor | ................... | G06F 3/0622 |
| 10,353,634 B1* | 7/2019 | Greenwood | ......... | G06F 3/0665 |
| 10,896,006 B1* | 1/2021 | Tian | ...................... | G06F 3/0649 |
| 11,048,591 B1* | 6/2021 | Mamidi | .............. | G06F 16/2246 |
| 11,385,931 B2 | 7/2022 | Liu et al. | | |
| 2010/0169570 A1* | 7/2010 | Mesnier | ............... | G06F 3/0685 |
| | | | | 711/E12.019 |
| 2011/0197027 A1* | 8/2011 | Balasubramanian | ....................... | |
| | | | | G06F 3/0685 |
| | | | | 711/E12.001 |
| 2012/0095968 A1* | 4/2012 | Gold | ................... | G06F 11/1464 |
| | | | | 707/652 |
| 2013/0042083 A1* | 2/2013 | Mutalik | .............. | G06F 16/1748 |
| | | | | 711/E12.103 |
| 2013/0238742 A1* | 9/2013 | Kay | .................... | H04L 67/1095 |
| | | | | 709/213 |
| 2014/0229675 A1* | 8/2014 | Aizman | ............... | G06F 3/0634 |
| | | | | 711/117 |
| 2015/0199366 A1* | 7/2015 | Marlatt | ................ | G06F 16/125 |
| | | | | 707/823 |
| 2017/0277435 A1* | 9/2017 | Wadhwa | ................ | G06F 3/067 |
| 2017/0277596 A1* | 9/2017 | Kyathanahalli | ....... | G06F 16/125 |

(Continued)

*Primary Examiner* — Adam Lee
(74) *Attorney, Agent, or Firm* — BainwoodHuang

(57) ABSTRACT

Techniques are directed to storage system management within a storage system. Such storage system management involves task scheduling. Along these lines, a group of tasks for execution may be selected based on task type use levels and priority levels. Accordingly, there may be more reasonable allocation of resources thus increasing the utilization of IO bandwidth.

20 Claims, 10 Drawing Sheets

(56) References Cited

U.S. PATENT DOCUMENTS

| | | | |
|---|---|---|---|
| 2017/0277597 A1* | 9/2017 | Dillon | G06F 11/1453 |
| 2019/0332298 A1* | 10/2019 | Madabhushi | G06F 3/0679 |
| 2019/0354296 A1* | 11/2019 | MacIntosh | G06F 3/0631 |
| 2019/0384675 A1* | 12/2019 | Klingenberg | G06F 11/1458 |
| 2019/0391743 A1* | 12/2019 | Matsui | G06F 3/0649 |
| 2020/0026426 A1* | 1/2020 | Ma | G06F 3/064 |
| 2020/0081743 A1* | 3/2020 | Hu | G06F 9/5016 |
| 2020/0133554 A1* | 4/2020 | Kishi | G06F 16/122 |
| 2020/0142625 A1* | 5/2020 | O'Reilly | G06F 3/0685 |
| 2020/0356297 A1* | 11/2020 | Kobayashi | G06F 3/0647 |
| 2020/0394072 A1* | 12/2020 | Sreekantaswamy | G06F 11/0793 |
| 2021/0081111 A1* | 3/2021 | Larsen | G06F 3/0605 |
| 2021/0342184 A1 | 11/2021 | Liu et al. | |
| 2021/0373956 A1 | 12/2021 | Krasner et al. | |
| 2022/0092008 A1 | 3/2022 | Kamran et al. | |
| 2022/0245034 A1* | 8/2022 | Nara | G06F 11/1469 |
| 2022/0342578 A1* | 10/2022 | Chen | G06F 3/0605 |

* cited by examiner

TASK SCHEDULING BASED ON TASK TYPE USE LEVELS AND PRIORITY LEVELS

CROSS-REFERENCE TO RELATED APPLICATION

This application claims priority to Chinese Patent Application No. CN202110836316.4, on file at the China National Intellectual Property Administration (CNIPA), having a filing date of Jul. 23, 2021, and having "METHOD, DEVICE AND COMPUTER PROGRAM PRODUCT FOR STORAGE SYSTEM MANAGEMENT" as a title, the contents and teachings of which are herein incorporated by reference in their entirety.

TECHNICAL FIELD

Embodiments of the present disclosure generally relate to the field of data storage, and in particular, to a method, a device, and a computer program product for storage system management.

BACKGROUND

In a storage system, physical storage resources may be classified through various types of hardware interfaces and media, such as non-volatile memory host controller interface specifications (NVMe), hard disk drives (HDD), and solid state drives (SSD). At a software level, the above-mentioned storage resources may be virtualized into a variety of virtual resources or a variety of virtual storage layers, such as data tiering capabilities, storage pool space, and idle data windows. These different types of virtual resource share physical storage resources of the storage system. Tasks of different task types are usually executed at different virtual resources. How to improve resources scheduling among various types of tasks performed on different virtual resources is a problem of concern.

SUMMARY OF THE INVENTION

Embodiments of the present disclosure provide a method, a device, and a computer program product for storage system management.

In a first aspect of the present disclosure, a method for storage system management is provided. The method includes: determining, in multiple task types, use levels of task types associated with corresponding storage layers in multiple storage layers based on respective current resource use statuses of the multiple storage layers in a storage system, where the multiple storage layers share physical resources of the storage system, and tasks are executed on the corresponding storage layers in accordance with the task types that they belong to; determining respective priority levels of the multiple task types based on respective historical resource use statuses of the multiple storage layers; and selecting, from multiple tasks, one group of tasks for execution based on the use levels and priority levels of the multiple task types and task types that the multiple to-be-executed tasks belong to, where the number of tasks belonging to each task type in the one group of tasks is determined by the use level of the corresponding task type, and the one group of tasks is sorted in accordance with corresponding priority levels of respective task types.

In a second aspect of the present disclosure, an electronic device is provided. The electronic device includes at least one processing unit and at least one memory. The at least one memory is coupled to the at least one processing unit and stores an instruction executed by the at least one processing unit. The instruction, when executed by the least one processing unit, causes the electronic device to perform actions including: determining, in multiple task types, use levels of task types associated with corresponding storage layers in multiple storage layers based on respective current resource use statuses of the multiple storage layers in a storage system, where the multiple storage layers share physical resources of the storage system, and tasks are executed on the corresponding storage layers in accordance with the task types that they belong to; determining respective priority levels of the multiple task types based on respective historical resource use statuses of the multiple storage layers; and selecting, from multiple tasks, one group of tasks for execution based on the use levels and priority levels of the multiple task types and task types that the multiple to-be-executed tasks belong to, where the number of tasks belonging to each task type in the one group of tasks is determined by the use level of the corresponding task type, and the one group of tasks is sorted in accordance with corresponding priority levels of respective task types.

In a third aspect of the present disclosure, a computer program product is provided. The computer program product is tangibly stored in a non-transitory computer storage medium and includes machine-executable instructions. The machine-executable instructions, when executed by a device, cause the device to execute any step of the method according to the first aspect of the present disclosure.

The Summary of the Invention is provided to introduce the selection of concepts in a simplified form, which will be further described in the Detailed Description below. The Summary of the Invention is neither intended to identify key features or essential features of the present disclosure, nor intended to limit the scope of the present disclosure.

BRIEF DESCRIPTION OF DRAWINGS

The above and other objectives, features, and advantages of the present disclosure will become more apparent by describing example embodiments of the present disclosure in further detail with reference to the accompanying drawings, and in the example embodiments of the present disclosure, the same reference numerals generally represent the same components.

The same or corresponding reference numerals in the various drawings represent the same or corresponding portions.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. Although the preferred embodiments of the present disclosure are shown in the accompanying drawings, it should be understood that the present disclosure may be implemented in various forms and should not be limited by the embodiments set forth herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

Figure 1:
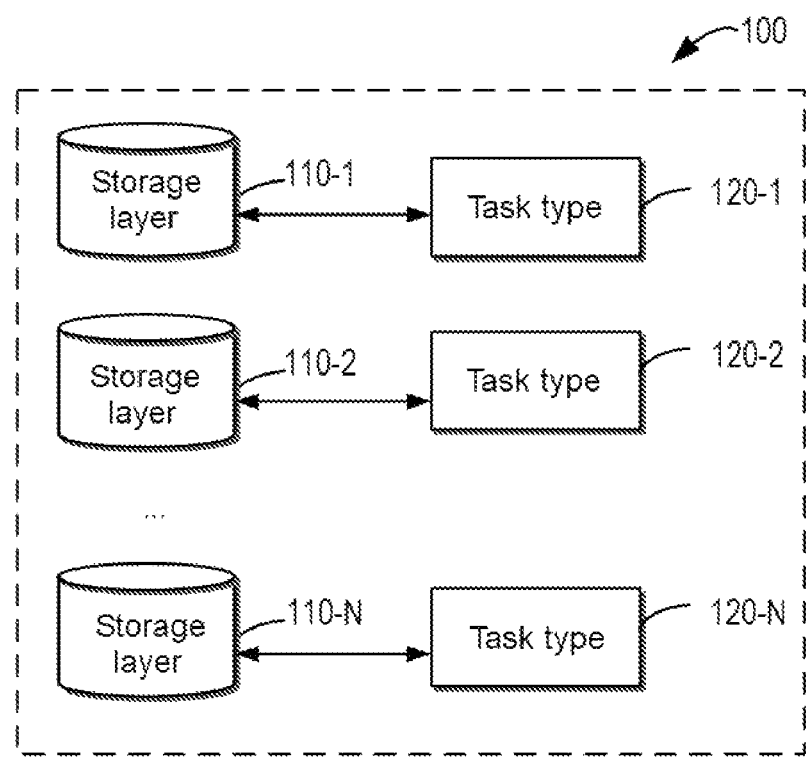
FIG. 1 shows a schematic diagram of an example system in which some embodiments of the present disclosure may be implemented.

FIG. 1 shows a schematic diagram of storage system 100 in which an embodiment of the present disclosure may be implemented. In storage system 100, physical storage resources may be provided and classified through various types of hardware interfaces and media, such as NVMe, serial connection small computer system interface (SAS) flash memory, HDD, SSD, and near line (NL)-SAS. Storage system 100 is used to provide a storage resource-related task, including such as defragmenting, idle resource recycling (also referred to as resource recycling), data Tiering, and the like. It should be understood that the system illustrated in FIG. 1 is only an example. In an actual application, more other devices and/or components in devices may exist in storage system 100, or the devices and/or components shown may be arranged in other manners.

As shown in FIG. 1, storage system 100 includes a plurality of (e.g., N) storage layers 110-1, 110-2, . . . , 110-N, where N is an integer greater than 1. Hereinafter, for ease of discussion, the storage layers 110-1, 110-2, . . . , and 110-N are sometimes collectively or individually referred to as storage layer 110. Herein, the storage layer is also referred to as a virtual storage layer or a virtual resource layer. Examples of storage layer 110 include, but are not limited to: data windows, storage pools, or storage Tiers. Individual storage layers 110 of storage system 100 share the physical storage resources of storage system 100. For example, individual storage layers 110 share a certain input/output (IO) bandwidth on storage system 100.

Individual storage layers 110 are associated with different task types 120. For example, storage layer 110-1 is associated with task type 120-1; storage layer 110-2 is associated with task type 120-2; . . . storage layer 110-N is associated with task type 120-N. Hereinafter, for ease of discussion, task types 120-1, 120-2, . . . , and 120-N are sometimes collectively or individually referred to as task type 120.

Various tasks in storage system 100 are executed on corresponding storage layers 110 in accordance with task types 120 that they belong to. For example, a task belonging to task type 120-1 is executed on storage layer 110-1. In other words, resources of the task belonging to task type 120-1 on storage layer 110-1. Herein, the task is also referred to as an operation or request. For example, if storage layer 110-1 is a data window (also referred to as a data window dispenser), task type 120-1 may be defragmented. A defragmenting task is used to organize an idle data window to support sequential data writing capabilities.

If storage layer 110-2 is a storage pool, task type 120-2 may be idle resource recycling. An idle resource recycling task is used to return idle space to the storage pool. Using the idle resource recycling task can ensure that there are sufficient resources in the storage pool for use.

If storage layer 110-N is storage tiering, task type 120-N may be data tiering. A data tiering task is used to reallocate hot data (i.e., data constantly accessed) from a low performance storage medium, such as an HDD, to a high performance storage medium, such as an SAS flash memory, an NVMe, and the like. A data tiering task provides an optimized IO performance for a hybrid storage system.

It should be understood that other storage layers 110 and associated task types 120 may be present in addition to examples of storage layer 110 and task type 120 associated therewith listed above. It should be understood that the number of storage layers 110 of storage system 100 may be set as desired, and the number of task types executed on storage layers 110 may also be set as desired. It should be understood that storage system 100 shown in FIG. 1 is merely an example and not limiting. The storage system according to the present disclosure may also have other forms or structures.

Typically, the tasks of above-mentioned various task types, such as defragmenting, idle resource recycling, and data tiering, all relate to use of common physical storage resources, such as IO bandwidth, and completion of data movement. When the tasks of the above-mentioned various task types are executed simultaneously, there will be mutual competing for the limited physical storage resources, such as IO bandwidth. However, in a conventional solution, it is difficult to reasonably allocate or schedule resources among the tasks of the above-mentioned various task types for execution of the tasks.

A conventional solution performs resource scheduling on the tasks by determining priority levels for the different task types. For example, a priority level of a data tiering task is typically set to the highest, a priority level of defragmenting is set to medium, and a priority level of idle resource recycling is set to the lowest. However, this conventional solution will cause many problems during use. This conventional solution will cause a task with a high priority level to be always scheduled preferentially, thereby affecting and even interrupting the execution of a task with a low priority level. For example, a defragmenting task may always interrupt the execution of an idle resource recycling task, thereby causing idle resources of a storage pool to be exhausted.

Embodiments of the present disclosure provide a solution for storage system management to solve the above-mentioned problem and one or more of other potential problems. In this solution, in multiple task types, use levels of task types associated with corresponding storage layers in multiple storage layers are determined based on respective current resource use statuses of the multiple storage layers. The solution also includes determining respective priority levels of the multiple task types based on respective historical resource use statuses of the multiple storage layers. The solution also includes selecting, from multiple tasks, one group of tasks for execution based on the use levels and priority levels of the multiple task types and task types that the multiple to-be-executed tasks belong to. The number of tasks of different task types in the selected one group of tasks is determined by use levels of the task types. The individual tasks in the selected one group of tasks are sorted based on priority levels of the individual task types.

In this way, the use level and priority level of each task type may be determined in accordance with current resource use statuses and historical use statuses of different storage layers. Thus, reasonable allocation of resources and reasonable scheduling of tasks can be achieved based on the current resource use statuses and historical use statues of the different storage layers. The solution of the present disclosure can allocate and utilize resources more reasonably, thereby improving overall performance of the storage system.

The fundamental principles and several example embodiments of the present disclosure will be described in detail below with reference to the accompanying drawings.

Figure 2:
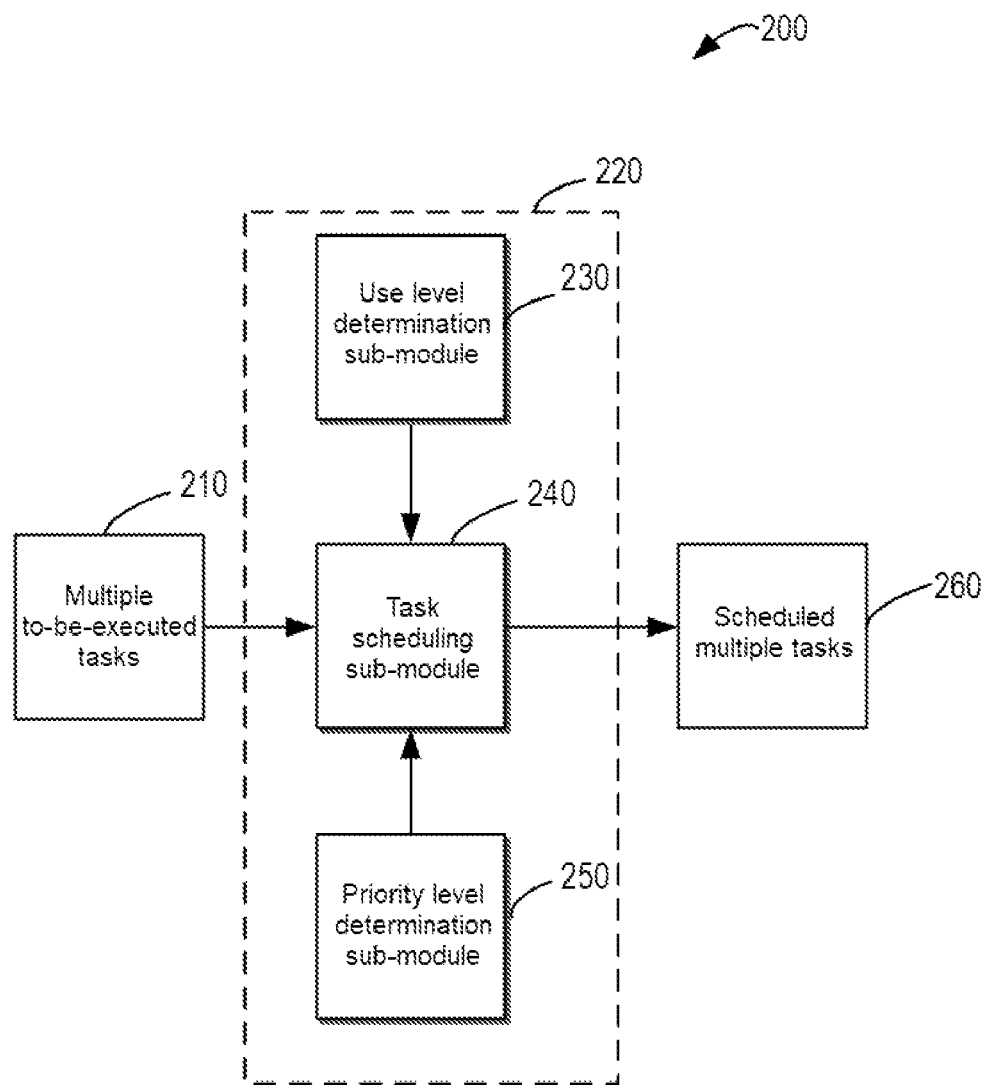
FIG. 2 shows a schematic block diagram of task resource scheduling according to some embodiments of the present disclosure.

FIG. 2 shows schematic block diagram 200 of task resource scheduling according to some embodiments of the present disclosure. As shown in FIG. 2, multiple to-be-executed tasks 210 may be input to task scheduling sub-module 240 in scheduling module 220. FIG. 2 also shows use level determination sub-module 230 and priority level determination sub-module 250 in scheduling module 220. Use level determination sub-module 230 and priority level determination sub-module 250 provide determined use levels and priority levels separately to task scheduling sub-module 240. Task scheduling sub-module 240 may determine scheduled multiple tasks 260 and output them based on multiple to-be-executed tasks 210 and the received use levels and priority levels.

The various modules and sub-modules in block diagram 200 may be implemented by a device of storage system 100. It should be understood that the modules and sub-modules in block diagram 200 may also be executed by other suitable devices or apparatuses. Block diagram 200 may include additional modules not shown and/or may omit modules shown, and the scope of the present disclosure is not limited in this regard. In order to facilitate explanation, the various modules and sub-modules in block diagram 200 will be described in detail below with reference to FIG. 3.

A flow chart of method 300 for task resource scheduling according to some embodiments of the present application will be described below with reference to FIG. 3. Method 300 may be implemented by a device of storage system 100. For example, each step in method 300 may be implemented by the modules and/or sub-modules shown in FIG. 2. It should be understood that method 300 may also be executed by other suitable devices or apparatuses. Method 300 may include additional actions not shown and/or may omit actions shown, and the scope of the present disclosure is not limited in this regard. In order to facilitate explanation, process 300 will be described with reference to FIG. 1 and FIG. 2.

Figure 3:
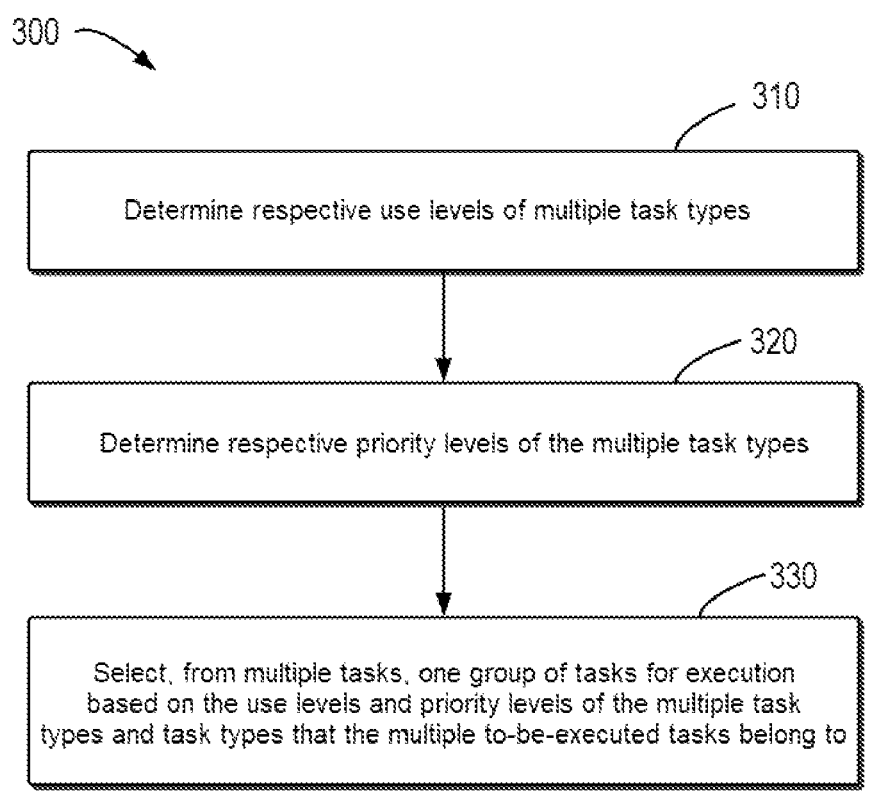
FIG. 3 shows a flow chart of an example method for task resource scheduling according to some embodiments of the present disclosure.

As shown in FIG. 3, at 310, scheduling module 220 determines respective use levels of multiple task types. For example, use level determination sub-module 230 in FIG. 2 may be used to determine, in multiple task types 120, use levels of the task types associated with corresponding storage layers in multiple storage layers 110 based on respective current resource use statuses of multiple storage layers 110. Multiple storage layers 110 share physical resources of storage system 100, and tasks in storage system 100 are executed on corresponding storage layers 110 in accordance with task types 120 that they belong to.

In some embodiments, respective use levels of multiple task types may be determined according to current resource use statuses of the storage layers in manners shown in Table 1 below. As shown in Table 1, for a storage pool, a use level of an idle resource recycling task type associated with the storage pool may be determined according to an idle space rate of the storage pool. For a data window, a use level of defragmenting task type associated with the data window may be determined according to an idle data window count. For a storage tier, a use level of data tiering task type associated with the storage tier may be determined according to a data tiering temperature.

TABLE 1

Use level Examples of Task Types

| Use level | Idle space rate of storage pool | Idle data window count | Data tiering temperature |
|---|---|---|---|
| 3 | <5% | <512 windows | >1000 |
| 2 | <30% | <3000 windows | >300 |
| 1 | >=30% | >=3000 windows | <=300 |

It should be understood that the various storage layer resource use statuses described above, such as idle space rate of storage pool, idle data window count, and data tiering temperature, may all be determined and recorded by storage system 100. In some embodiments, other types of storage layers and other types of storage layer resource use statuses may also be included.

The use level determination manners shown in Table 1 are merely by way of example, not limiting. In some embodiments, more use levels may be provided. For example, a use level may be set to 1-8 or different levels in other suitable ranges.

In this way, storage resource use statuses of different storage layers represented in different manners may be represented in a normalized manner. By using use levels similar to 1, 2 and 3 in Table 1, the use levels may be represented intuitively and simply, and execution of subsequent task resource scheduling is facilitated.

Additionally or alternatively, in some embodiments, a use level of each task type 120 may be determined based on respective average resource use statuses of multiple storage layers 110 in a current first period of time. For example, in some embodiments, a current scheduling cycle (i.e., the first period of time) may be divided into M (e.g., 5 or other suitable natural numbers) observation windows. At each observation window, the use level of each task type 120 is determined once according to the resource use status of each storage layer 110. For each task type 120, an average value by averaging use levels determined in the M times may be determined as the use level of the task type 120. It should be understood that a length of a current scheduling period may be a time length determined based on experience, or may be a time length determined according to a current situation of a to-be-executed task.

In some embodiments, the use level of each task type 120 may also be determined based on respective average resource use statuses of multiple storage layers 110 in the current first period of time using other manners. For example, weights HC may be determined according to respective average resource use statuses of multiple storage layers 110 in the current first period of time. The use levels of task types 120 may be determined according to the weights HC and the resource use statuses of storage layers 110 at a current moment.

The weights HC may be determined by the following process. For each storage layer 110 (i.e., for each task type 120), the use levels are determined separately at the M observation windows of the current scheduling cycle. The numbers of use level values are counted and determined as weights HC. For example, during M times, e.g., 5 times, of determinations, in total, a use level having a value of 1 is determined for 1 time, a use level having a value of 2 is determined for 3 times, and a use level having a value of 3 is determined for 1 time. In this example, the weights HC of the use levels having the values of 1, 2, and 3 for this storage layer 110 (i.e., for each task type 120) are 1, 3, and 1, respectively.

In some embodiments, only the above-mentioned weight Max HC having the maximum value may be retained, i.e., the use levels having other low count numbers are removed by filtering. In this example, the weights HC of the use levels having the values of 1, 2, and 3 for this storage layer 110 (i.e., for each task type 120) are 0, 3, and 0, respectively. In this way, it can be obtained that the use level of this task type 120 adjusted according to the weights is 2*3=6.

In this way, resource use statuses of the storage layers in a recent period of time (short term) may be considered, thereby avoiding the problem that the use level is inaccurately determined due to a sudden change in a certain time of resource use status. In this way, a more accurate use level can be determined.

Additionally or alternatively, in some embodiments, respective use levels of multiple task types 120 may be updated based on respective average historical resource use statuses of multiple storage layers 110 in a second period of time before a current moment. The second period of time is a long period of time and is longer than a current scheduling cycle or the first period of time. For example, K (e.g., 5 or other suitable natural numbers) scheduling cycles before the current moment may be determined as the second period of time.

Use level records of the previous K scheduling cycles or Max HC records of the previous K scheduling cycles may be acquired separately. Table 2 below shows a record table of Max HCs of the previous K scheduling cycles. In Table 2, the value of K is 5, and the value of the use level is 1, 2, or 3.

TABLE 2

Record Table of Max HCs of K Scheduling Cycles

| | Use level 1 | Use level 2 | Use level 3 |
|---|---|---|---|
| Cycle 1 | 0 | 3 | 0 |
| Cycle 2 | 0 | 0 | 4 |
| Cycle 3 | 2 | 2 | 0 |
| Cycle 4 | 0 | 2 | 2 |
| Cycle 5 | 0 | 0 | 3 |

According to Table 2, miss count MC, normalized miss count NMC, and inverse miss count IMC may be calculated. The miss count MC indicates a count for each use level not belonging to the K scheduling cycles, for example, Max HC of use level 1 in Table 2 is not 0 only in cycle 3, and MC of use level 1 is 4. NMC=MC/K, and MC is normalized. IMC=1/NMC=K/MC, that is, a reciprocal of NMC. Table 3 below shows values of MC, NMC, and IMC calculated according to example Max HC of Table 2.

TABLE 3

Example MC, NMC, and IMC Values

| | Use level 1 | Use level 2 | Use level 3 |
|---|---|---|---|
| Cycle 1 | 0 | 3 | 0 |
| Cycle 2 | 0 | 0 | 4 |
| Cycle 3 | 2 | 2 | 0 |
| Cycle 4 | 0 | 2 | 2 |
| Cycle 5 | 0 | 0 | 3 |
| MC | 4 | 2 | 2 |
| NMC | 4/5 | 2/5 | 2/5 |
| IMC | 1.25 | 2.5 | 2.5 |

It should be understood that the higher the value of NMC is, the more likely that the use level is not a dominant use level in the observation cycles (i.e., K scheduling cycles). A higher IMC indicates that this level is more likely the dominant use level. If the value of MC is 0, IMC may be set to a preset maximum value IMCMAX, such as 10 or other suitable values greater than other IMCs.

By using IMC rather than HC to represent a long-term use level status, an HC matrix becoming gradually sparse as the observation cycles increase can be avoided. By using IMC instead of HC, more accurate results for a long-term use level assessment can be provided.

The use levels of task types 120 may be updated by the above-described long-term assessment of a use level according to IMC. For example, following formula (1) may be used to calculate the adjusted final use level.

$$hc\text{-}imc \text{ weight} = \text{Level} * HC * IMC = \Sigma_i^N L_i * HC_i \times IMC_i \qquad (1)$$

In formula (1), hc–imc weight represents a use level based on short-term and long-term factors (i.e., a use level considering a current first period of time and a historical second period of time). Level represents the use level, and the value of Level is a natural number of 1 to N. N may be any natural number greater than 1, and for example, in the examples of Table 2 and Table 3, N is 3. Examples of the adjusted use levels obtained according to formula (1) are shown below in Table 4 to Table 6.

TABLE 4

Examples of Defragmenting Use Level

| Defragmenting | HC | IMC |
|---|---|---|
| $L_3$ | 3 | 2 |
| $L_2$ | 1 | 2 |
| $L_1$ | 1 | 4 |
| hc − imc weight | 26 | |

TABLE 5

Examples of Idle Resource Recycling Use Level

| Idle resource recycling | HC | IMC |
|---|---|---|
| $L_3$ | 1 | 2 |
| $L_2$ | 1 | 2 |
| $L_1$ | 3 | 4 |
| hc − imc weight | 22 | |

TABLE 6

Examples of Idle Resource Recycling Use Level

| Data tiering | HC | IMC |
|---|---|---|
| $L_3$ | 3 | 4 |
| $L_2$ | 1 | 2 |
| $L_1$ | 1 | 2 |
| hc − imc weight | 42 | |

According to the above Table 4 to Table 6, it can be seen that HC of defragmenting task type and HC of data tiering task type are identical, that is, the two have similar use levels in a current period of time. However, IMC of use level 3 of the data tiering task type is 4, while IMC of use level 3 of the data tiering task type is 2. This indicates that according to a long-term historical resource use status, data tiering has a higher use level.

hc−imc weight according to formula (1) can reflect the higher use level of data tiering. In this way, data tiering can obtain a higher use level, thereby obtaining more IO bandwidth. This manner of determining a use level by considering both a short-term resource use status and a long-term resource use status is particularly applicable to task scheduling of multiple task types having similar short-term resource use statuses.

Next, at 320, scheduling module 220 determines respective priority levels of multiple task types 120. For example, priority level determination sub-module 250 may determine respective priority levels of multiple task types 120 based on respective historical resource use statuses of multiple storage layers 110. In some embodiments, a scheduling proportional interval among task types 120 may be determined according to the priority levels of task types 120. Herein, a priority level is also referred to as an interval level.

In some embodiments, task types 120 that have been used in storage system 100 may be determined based on respective historical resource use statuses of multiple storage layers 110. The priority levels of used task types 120 are set to a large value, such as 1, and the priority levels of task types 120 not used are set to a small value, such as 0.

Additionally or alternatively, the priority levels of multiple task types 120 may further be determined according to changes in respective historical resource usages of multiple storage layers 110. For example, for task types 120, their priority levels may be determined according to changes in their historical resource usages in a third period of time before a current moment. The third period of time may be the same as the second period of time described above, or may be selected as other time periods.

Taking the above-mentioned Table 2 as an example, for each type task 120, an average dominant use level of each scheduling cycle may be calculated. It should be understood that when MAX HCs of two use levels are identical, an average dominant use level may be obtained by averaging the Max HCs.

TABLE 7

Examples of Average Use Level

| Scheduling cycle | Cycle 1 | Cycle 2 | Cycle 3 | Cycle 4 | Cycle 5 |
|---|---|---|---|---|---|
| Use level (N) | 2 | 3 | 1.5 = (1 + 2)/2 | 2.5 = (2 + 3)/2 | 3 |

Table 8 shows average use level examples of various task types. From Table 8, changes in the use levels of task types 120 in the third period of time may be obtained.

TABLE 8

Examples of Average Use Levels of Different Task Types

| Scheduling cycle | Cycle 1 | Cycle 2 | Cycle 3 | Cycle 4 | Cycle 5 |
|---|---|---|---|---|---|
| Defragmenting | 2 | 1.5 | 2 | 2.5 | 3 |
| Idle resource recycling | 3 | 2.5 | 1.5 | 2 | 1 |
| Data tiering | 2 | 2.5 | 2 | 2.5 | 2 |

Figure 4:
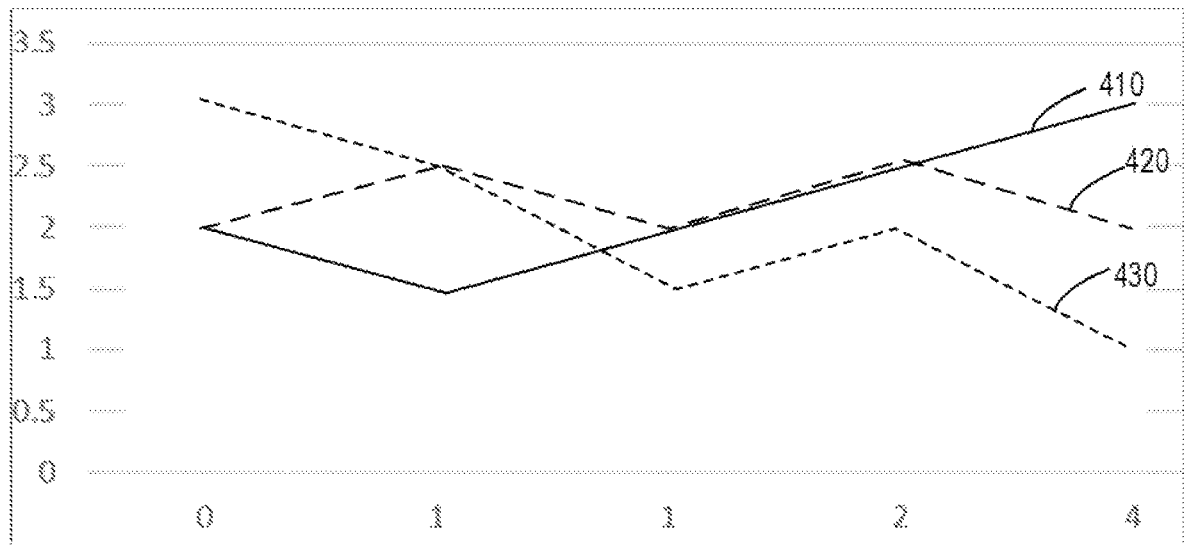
FIG. 4 shows a schematic diagram of a historical resource use status according to some embodiments of the present disclosure.

FIG. 4 shows a schematic diagram of a historical resource use status according to some embodiments of the present disclosure. Curve 410 in FIG. 4 is drawn from the average use level of defragmenting in Table 8. Curve 420 is drawn from the average use level of data tiering in Table 8. Curve 430 is drawn from the average use level of idle resource recycling in Table 8. As can be seen from FIG. 4, the average use level of defragmenting is gradually increased, so that a priority level of defragmenting may be determined as the highest, such as 3. The average use level of idle resource recycling tends to decrease, so that its priority level may be determined as the lowest, such as 1. A priority level of data tiering may be determined as a medium, such as 2. It should be understood that the values 1, 2, and 3 of the priority levels described above are merely illustrative, not limiting. The priority levels may also be determined as other suitable values.

Additionally or alternatively, the priority levels may be calculated using formula (2) or formula (3).

$$\text{index level increment'} = \Sigma_{i=2}^{N} \Delta(\text{index level}_i - \text{index level}_{i-1}) \quad (2)$$

$$\text{index level increment'} = \Sigma_{i=2}^{N} \Delta(\text{index level}_i - \text{index level}_{i-1}) + N + 1 \quad (2)$$

index level$_i$ and index level$_{i-1}$ in formula (2) and formula (3) represent average use level i and average use level i−1, respectively. $\Delta(\cdot)$ represents a differencing function. i is a value greater than or equal to 2 and is less than or equal to highest use level N (e.g., 3). index level increment' represents an average use level increment between −N and N obtained by calculating. index level increment indicates that the average use level increment is represented as an increment value between 1 and N+1. By increasing offset N+1, a positive value is used to represent an offset, which is easier to calculate. Table 9 shows an average use level increment determined according to the examples of Table 8.

TABLE 9

Examples of Offset Average Use Level

| Scheduling cycle | Cycle 1 | Cycle 2 | Cycle 3 | Cycle 4 | Cycle 5 | index level increment |
|---|---|---|---|---|---|---|
| Defragmenting | 2 | 1.5 | 2 | 2.5 | 3 | 5 |
| Idle resource recycling | 3 | 2.5 | 1.5 | 2 | 1 | 2 |
| Data tiering | 2 | 2.5 | 2 | 2.5 | 2 | 4 |

According to Table 9, the priority levels of task types 120 may be separately set to a value of the offset average use level increment. For example, the priority level of defragmenting may be set to 5, the priority level of idle resource recycling may be set to 2, and the priority level of data tiering may be set to 4.

In this way, a high priority level may be set for task types 120 that have a gradually increased use level, so that these task types can be sorted preferentially when subjected to task scheduling. By doing so, a next use level can be predicted according to a change in the use level (i.e., a change in the historical use status).

Returning to FIG. 3, at 330, scheduling module 220 selects, from multiple tasks, one group of tasks for execution based on the use levels and priority levels of multiple task types 120 and task types 120 that multiple to-be-executed tasks 210 belong to. For example, task scheduling sub-module 240 may select, from multiple to-be-executed tasks 210, one group of tasks for execution in the current scheduling cycle based on the use level determined by the use level determination sub-module 230, the priority level determined by the priority level determination sub-module 250, and multiple to-be-executed tasks 210. The remaining tasks may be executed in following or next multiple scheduling cycles.

In this one group of tasks, the number of tasks belonging to corresponding task types in multiple task types 120 is determined by the use levels of the corresponding task types. This one group of tasks is sorted in accordance with the priority levels of respective task types 120. For the remaining tasks, selecting and sorting may be performed in a similar manner. All tasks in multiple to-be-executed tasks 210 are scheduled, including selecting and sorting, and then scheduled multiple tasks 260 may be obtained.

In some embodiments, a weighted load balancing WRR algorithm or an IWRR algorithm having an interval proportion may be used to select one group of tasks from multiple tasks 210 based on the use levels and priority levels of multiple task types 120 and task types that the multiple to-be-executed tasks 210 belong to.

Additionally or alternatively, one group of tasks may be selected from multiple to-be-executed tasks 210 based on the use levels of multiple task types 120. In the selected one group of tasks, the number of tasks belonging to corresponding task types in multiple task types 120 does not exceed a number indicated by the use levels of corresponding task types 120. This one group of tasks may be sorted alternately in accordance with task types and in accordance with a number indicated by priority levels of task types 120.

Figure 5:
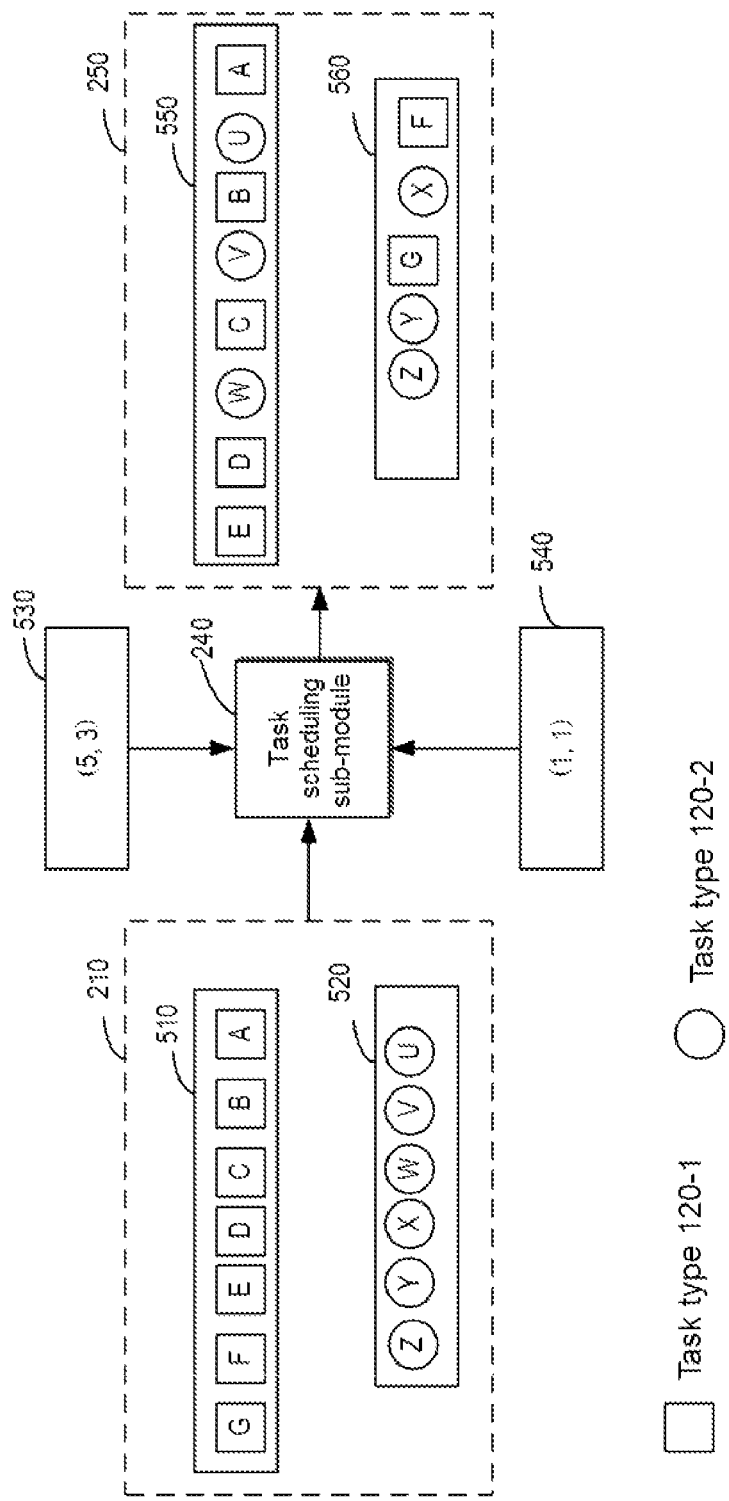
FIG. 5 shows a schematic diagram of task resource scheduling according to some embodiments of the present disclosure.
Figure 6:
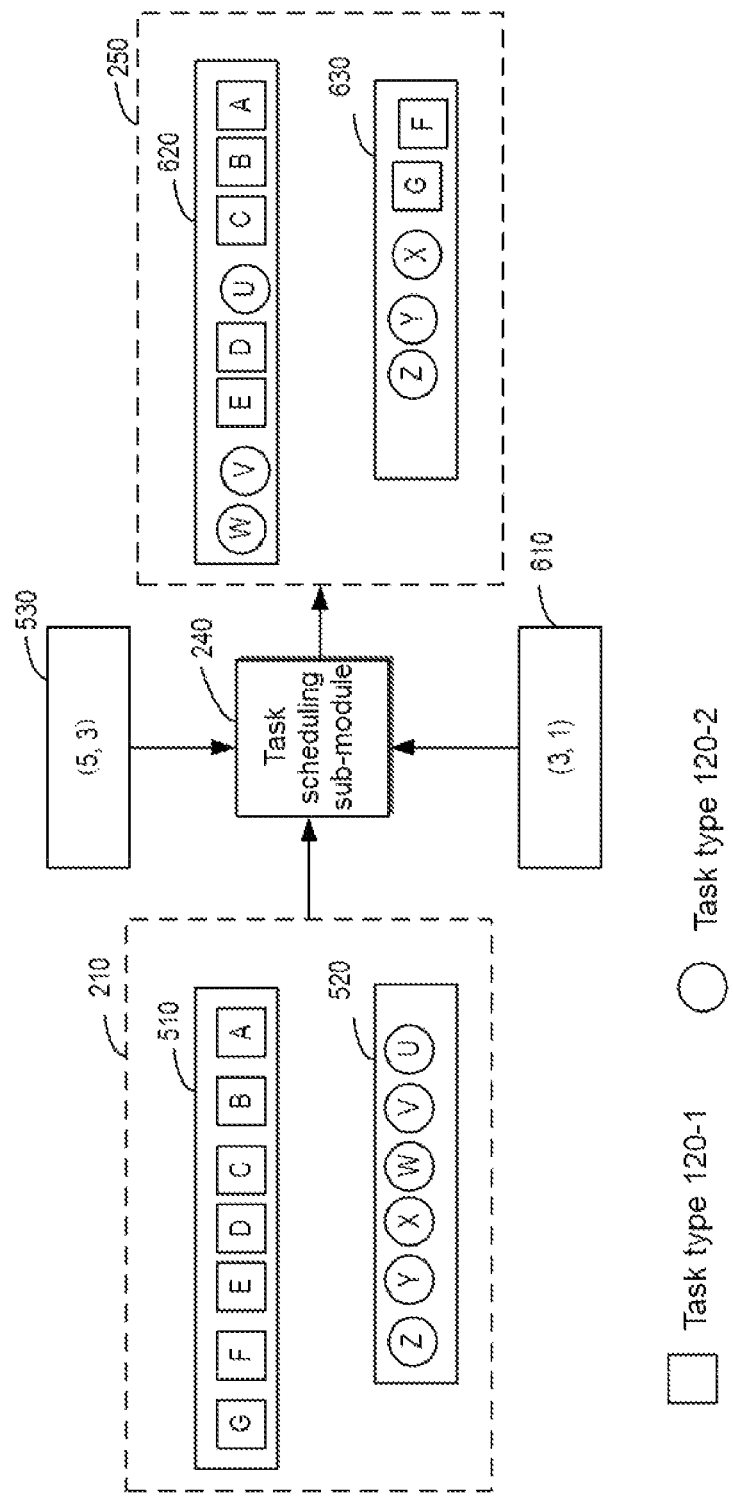
FIG. 6 shows another schematic diagram of task resource scheduling according to some embodiments of the present disclosure.

FIG. 5 and FIG. 6 show two schematic diagrams of task resource scheduling according to some embodiments of the present disclosure. As shown in FIG. 5, multiple to-be-executed tasks 210 include first task sequence 510 belonging to task type 120-1 and second task sequence 520 belonging to task type 120-2. First task sequence 510 and second task sequence 520 may be in a form of a queue, or in other suitable sequence forms. First task sequence 510 includes tasks A, B, C, D, E, F, and G. Second task sequence 520 includes tasks U, V, W, X, Y, and Z. It should be understood that the above alphabetic symbols, such as A and U, are merely schematic, and do not represent contents of the tasks represented.

Use level sequence 530 may be determined by use level determination sub-module 230, and in FIG. 5, use level sequence 530 is (5, 3). Priority level sequence 540 may be determined by priority level determination sub-module 250, and in FIG. 5, use level sequence 530 is (1, 1). Task scheduling module 240 may obtain scheduled multiple tasks 250 based on multiple to-be-executed tasks 210, use level sequence 530, and priority level sequence 540. As shown in FIG. 5, the scheduled multiple tasks 250 include two task sequences, task sequence 550 and task sequence 560. Task sequences 550 may be executed in the current scheduling cycle, and task sequence 560 may be executed in the next scheduling cycle.

As shown in FIG. 5, task sequences 550 may sequentially include tasks A, U, B, V, C, W, D, and E. It can be seen that in task sequences 550, the number of tasks belonging to task type 120-1 is 5, and the number of tasks belonging to task type 120-2 is 3. Tasks of task sequences 550 belonging to different task types are sorted alternately in accordance with an interval proportion of 1:1.

Similar to FIG. 5, FIG. 6 has the same two task sequences 510 and 520 of multiple to-be-executed tasks 210, and the same use level sequence 530. The example of FIG. 6 is different from FIG. 5 in that priority level sequence 610 is different, and the priority level sequence 610 is (3, 1). As can be seen from FIG. 6, since priority level sequence 610 is different, task sequence 620 and task sequence 630 in scheduled multiple tasks 250 determined by task scheduling sub-module 240 are different from task sequences 550 and task sequence 560 of FIG. 5.

As shown in FIG. 6, task sequence 620 includes tasks A, B, C, U, D, E, V, and W. In task sequence 620, similar to task sequence 550, the number of tasks belonging to task type 120-1 is also 5, and the number of tasks belonging to task type 120-2 is also 3. The difference lies in that a sorting sequence of the various tasks in task sequence 620 is different from task sequence 550.

Task sequence 620 obtained by sorting based on priority level sequence 610 of FIG. 6 can preferentially execute tasks belonging to task type 120-1. In a case where a historical use level of task type 120-1 gradually increases, such a task sorting manner can achieve a better resource scheduling effect.

Figure 7:
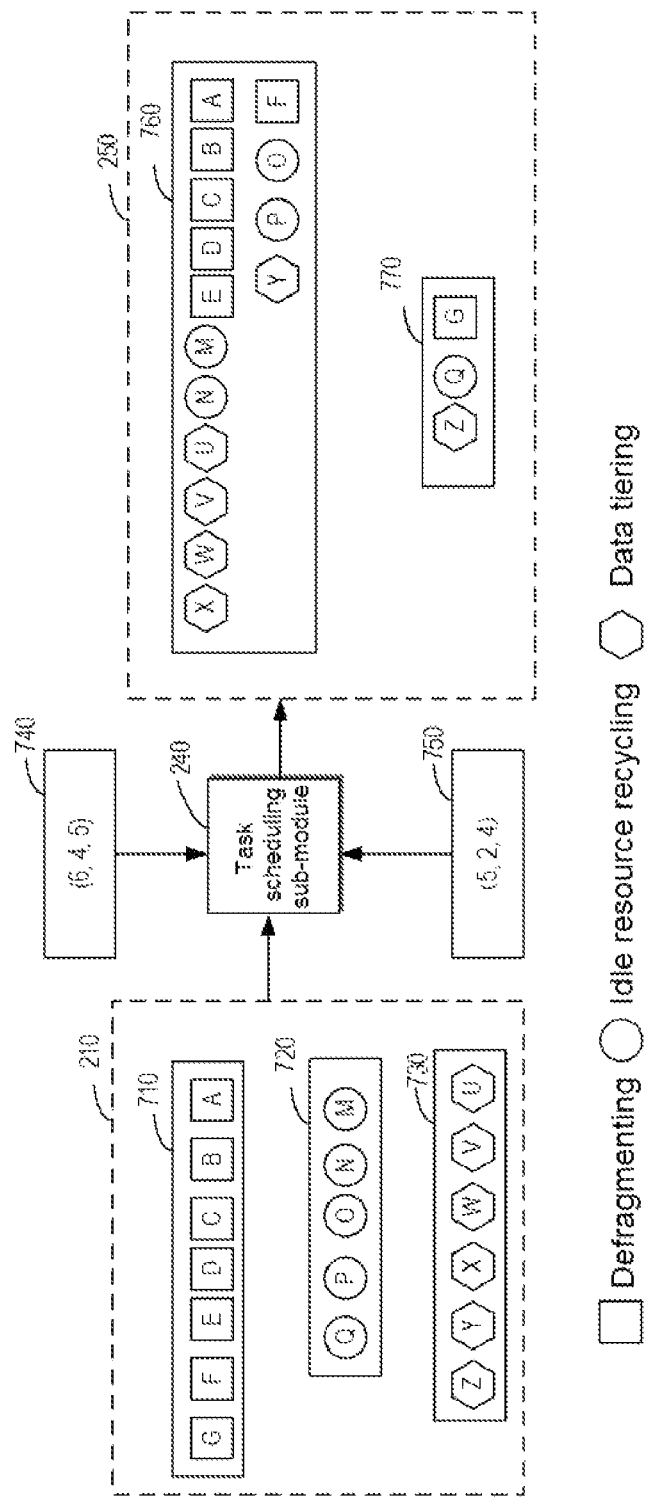
FIG. 7 shows another schematic diagram of task resource scheduling according to some embodiments of the present disclosure.

FIG. 7 shows another schematic diagram of task resource scheduling according to some embodiments of the present disclosure. Use level sequence 740 in FIG. 7 may be determined by use level determination sub-module 230 according to the process described above. Priority level sequence 750 in FIG. 7 may be determined by priority level determination sub-module 250 according to Table 9.

Multiple to-be-executed tasks 210 in FIG. 7 include three task sequences 710, 720, and 730. A task type of task sequence 710 is defragmenting. A task type of task sequence 720 is idle resource recycling. A task type of task sequence 730 is data tiering.

Task scheduling sub-module 240 may schedule three task sequences 710, 720, and 730 of multiple to-be-executed tasks 210 based on use level sequence 740 and priority level sequence 750, so as to obtain scheduled task sequence 760 executed in the current scheduling cycle and scheduled task sequence 770 executed in the next scheduling cycle. It should be understood that the maximum number of tasks that can be executed in each scheduling cycle may be determined by a sum of use levels of various task types. As shown in FIG. 7, task sequence 760 executed in the current scheduling cycle includes tasks A, B, C, D, E, M, N, U, V, W, X, F, O, P, and Y. Task sequence 770 executed in the next scheduling cycle includes tasks G, Q, and Z.

Figure 8A:
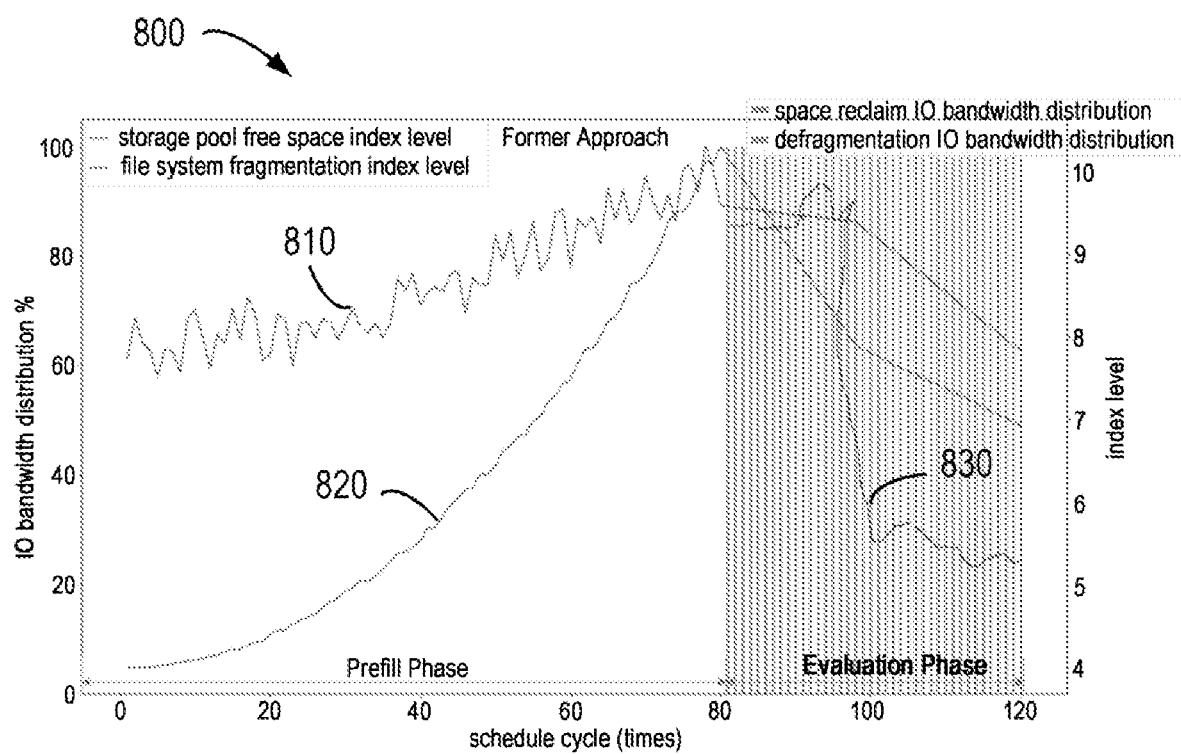
FIGS. 8A and 8B show a schematic diagram of a resource use status according to some embodiments of the present disclosure and a resource use status of a conventional solution.
Figure 8B:
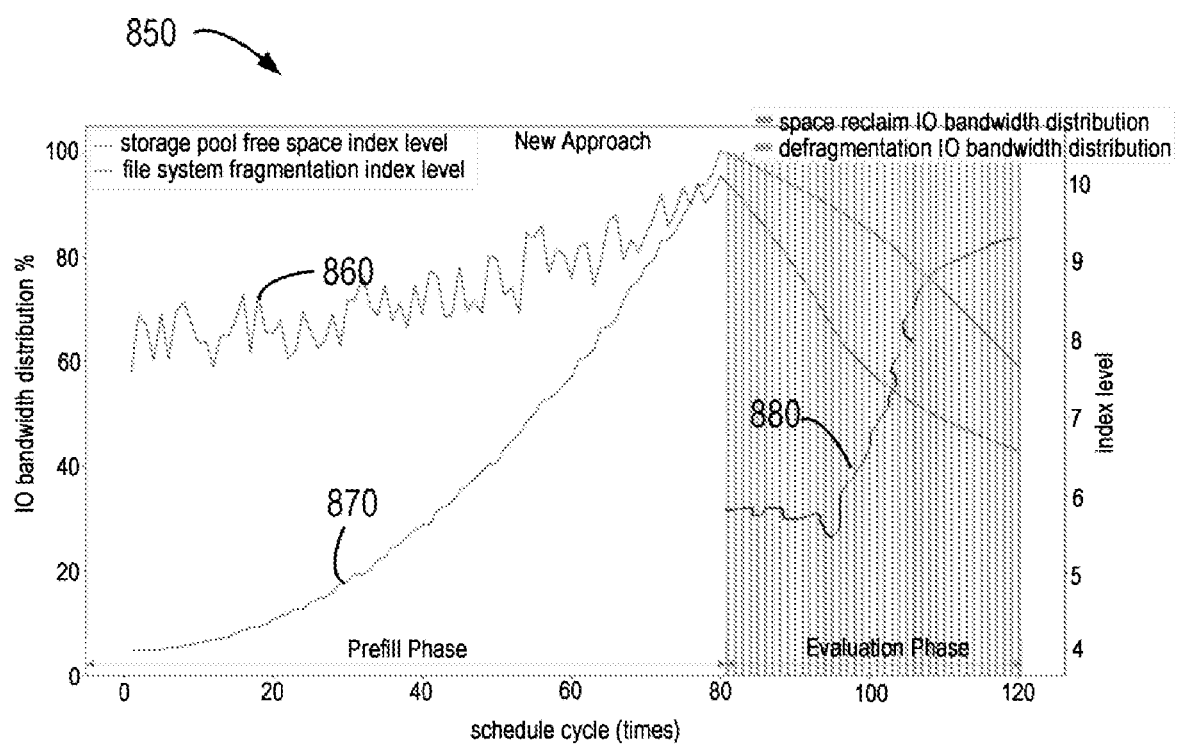

FIGS. 8A and 8B show a schematic diagram of resource use status 850 according to some embodiments of the present disclosure and resource use status 800 of a conventional solution. In resource use status 800 of the conventional solution, curve 810 represents a use level change curve of the defragmenting task type. Curve 820 represents a use level transform curve of the idle resource recycling task type. Curve 830 shows a proportion of defragmenting tasks to idle resource recycling tasks. Defragmenting tasks are above curve 830, and idle resource recycling tasks are below curve 830.

In resource use status 850 of the present solution, curve 860 represents a use level change curve of the defragmenting task type. Curve 870 represents a use level transform curve of the idle resource recycling task type. Curve 880 shows a proportion of defragmenting tasks to idle resource recycling tasks. Defragmenting tasks are above curve 880, and idle resource recycling tasks are below curve 880.

It can be seen from a comparison between use status 800 and use status 850 that in use status 800, the use level of the defragmenting task type rapidly decreases in 80 to 100 scheduling cycles. This will cause a decrease in 10 performance. Similarly, in use status 800, after 100 scheduling cycles, the use levels of idle resource recycling tasks rapidly decrease, which will cause a decrease in executing performance of the idle resource recycling tasks. In contrast, the use levels of the various task types in use status 850 gently decrease, and a decrease in the executing performance due to competing from each other never occurs.

Examples of task resource scheduling according to some embodiments of the present disclosure are shown above with reference to FIG. 1 to FIG. 8A. Through the present disclosure, multiple to-be-executed tasks can be scheduled according to respective current and historical resource use statuses of different storage layers, so that resources used by the various task types can be more reasonably allocated. In this way, utilization rate of 10 bandwidth can be increased, thereby improving the performance of a storage system.

Figure 9:
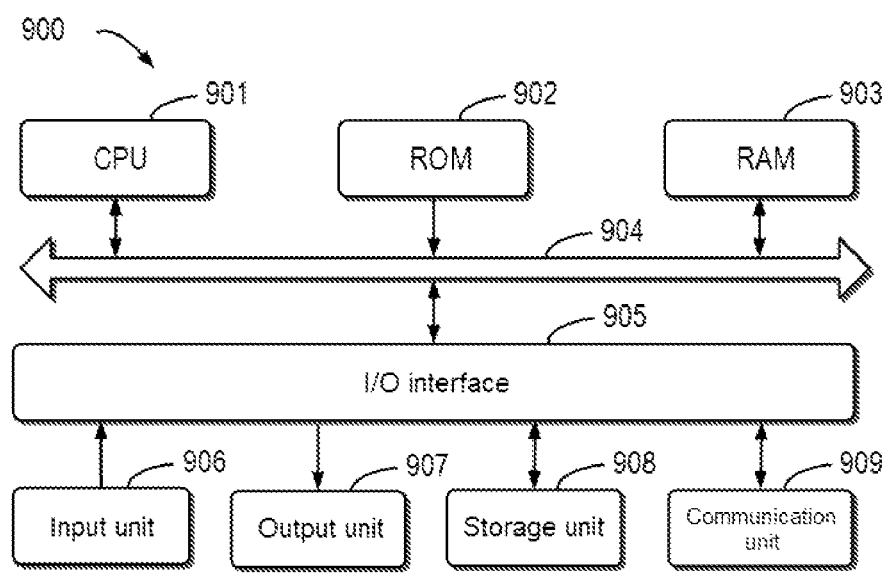
FIG. 9 shows a schematic block diagram of an example device that may be configured to implement an embodiment of the present disclosure.

FIG. 9 shows a schematic block diagram of example device 900 that may be configured to implement the embodiments of the present disclosure. For example, storage system 100 as shown in FIG. 1 may be implemented by device 900. As shown in FIG. 9, device 900 includes central processing unit (CPU) 901 that may perform various appropriate actions and processing according to computer program instructions stored in read-only memory (ROM) 902 or computer program instructions loaded from storage unit 908 into random access memory (RAM) 903. Various programs and data required for the operation of device 900 may also be stored in RAM 903. CPU 901, ROM 902, and RAM 903 are connected to each other through bus 904. Input/output (I/O) interface 905 is also connected to bus 904.

A plurality of components in device 900 are connected to I/O interface 905, including: input unit 906, such as a keyboard and a mouse; output unit 907, such as various types of displays and speakers; storage unit 908, such as a magnetic disk and an optical disc; and communication unit 909, such as a network card, a modem, and a wireless communication transceiver. Communication unit 909 allows device 900 to exchange information/data with other devices via a computer network, such as the Internet, and/or various telecommunication networks.

The various processes and processing described above, such as method 300, may be executed by processing unit 901. For example, in some embodiments, method 300 may be implemented as a computer software program that is tangibly included in a machine-readable medium such as storage unit 908. In some embodiments, part or all of the computer program may be loaded and/or installed onto device 900 via ROM 902 and/or communication unit 909. When the computer program is loaded into RAM 903 and executed by CPU 901, one or more actions of method 300 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read only memory (EPROM or flash memory), a static random access memory (SRAM), a portable compact disk read only memory (CD-ROM), a digital versatile disk (DVD), a memory stick, a floppy disk, a mechanical encoding device such as a punch card or a protruding structure within a groove having instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming language such as Smalltalk and C++, and conventional procedural programming languages such as the "C" language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or implemented using a combination of special hardware and computer instructions.

The embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

The invention claimed is:

1. A method executed within a storage system for storage system management, comprising:
  executing a task of one group of tasks on a corresponding storage layer in the storage system, the one group of tasks being from multiple tasks to be executed on corresponding storage layers in the storage system in accordance with multiple task types that the multiple tasks belong to and use levels and priority levels of the multiple task types, wherein;
    a number of tasks belonging to corresponding task types of the multiple task types in the one group of tasks is based on the use levels of the corresponding task types of the multiple task types,
    the one group of tasks is sorted in accordance with priority levels of the corresponding task types,
    the use levels are associated with the corresponding storage layers in multiple storage layers of the storage system based on respective current resource use statuses of the multiple storage layers,
    the multiple storage layers share physical resources of the storage system, and
    the priority levels of the multiple task types are based on respective historical resource use statuses of the multiple storage layers.

2. The method according to claim 1, wherein the use levels of the multiple task types are based on respective average resource use statuses of the multiple storage layers in a current first period of time.

3. The method according to claim 2, wherein the use levels of the multiple task types are based on respective average historical resource use statuses of the multiple storage layers in a second period of time before the current first period of time, wherein the second period of time is longer than the current first period of time.

4. The method according to claim 1, wherein the priority levels of the multiple task types associated with the multiple storage layers are based on changes in respective historical resource usages of the multiple storage layers in a third period of time before a current moment, and wherein task types associated with storage layers having gradually increasing historical resource usages correspond to high priority levels.

5. The method according to claim 1, wherein the one group of tasks is based on a weighted load balancing algorithm.

6. The method according to claim 1, wherein the number of tasks belonging to corresponding task types in the multiple task types does not exceed a number that the use levels of the corresponding task types indicate.

7. The method according to claim 1, wherein the one group of tasks is sorted alternately according to task types and in accordance with a number that the priority levels of respective task types indicate.

8. The method according to claim 1, wherein the multiple task types comprise at least two of the following: defragmenting, idle resource recycling, or data tiering.

9. The method according to claim 1, further comprising: before the one group of tasks is executed, outputting the one group of tasks into a queue for execution.

10. The method according to claim 9, wherein the one group of tasks is outputted into the queue in a task sequence order; and wherein the method further comprises:
executing the one group of tasks based on the task sequence order.

11. The method according to claim 1, wherein the executed task reallocates data from a low performance storage medium to a high performance storage medium within
the storage system.

12. An electronic device, comprising:
at least one processor; and
at least one memory storing computer program instructions, wherein the at least one memory and the computer program instructions are configured to cause, together with the at least one processor, the electronic device to execute actions comprising:
executing a task of one group of tasks on a corresponding storage layer in a storage system, the one group of tasks being from multiple tasks to be executed on corresponding storage layers in the storage system in accordance with multiple task types that the multiple tasks belong to and use levels and priority levels of the multiple task types, wherein:
a number of tasks belonging to corresponding task types of the multiple task types in the one group of tasks is based on the use levels of the corresponding task types of the multiple task types,
the one group of tasks is sorted in accordance with priority levels of the corresponding task types,
the use levels are associated with the corresponding storage layers in multiple storage layers of the storage system based on respective current resource use statuses of the multiple storage layers,
the multiple storage layers share physical resources of the storage system, and
the priority levels of the multiple task types are based on respective historical resource use statuses of the multiple storage layers.

13. The electronic device according to claim 12, wherein the use levels of the multiple task types are based on respective average resource use statuses of the multiple storage layers in a current first period of time.

14. The electronic device according to claim 13, wherein the use levels of the multiple task types are based on respective average historical resource use statuses of the multiple storage layers in a second period of time before the current first period of time, wherein the second period of time is longer than the current first period of time.

15. The electronic device according to claim 12, wherein the priority levels of the multiple task types associated with the multiple storage layers are based on changes in respective historical resource usages of the multiple storage layers in a third period of time before a current moment, and wherein task types associated with storage layers having gradually increasing historical resource usages correspond to high priority levels.

16. The electronic device according to claim 12, wherein the one group of tasks is based on a weighted load balancing algorithm.

17. The electronic device according to claim 12, wherein the number of tasks belonging to corresponding task types in the multiple task types does not exceed a number that the use levels of the corresponding task types indicate.

18. The electronic device according to claim 12, wherein the one group of tasks is sorted alternately according to task types and in accordance with a number that the priority levels of respective task types indicate.

19. The electronic device according to claim 12, wherein the multiple task types comprise at least two of the following: defragmenting, idle resource recycling, or data tiering.

20. A computer program product having a non-transitory computer readable medium which stores a set of instructions to perform storage system management; the set of instructions, when executed by computerized circuitry, cause the computerized circuitry to execute a method of:
executing a task of one group of tasks on a corresponding storage layer in a storage system, the one group of tasks being from multiple tasks to be executed on corresponding storage layers in the storage system in accordance with multiple task types that the multiple tasks belong to and use levels and priority levels of the multiple task types, wherein;
a number of tasks belonging to corresponding task types of the multiple task types in the one group of tasks is based on the use levels of the corresponding task types of the multiple task types,
the one group of tasks is sorted in accordance with priority levels of the corresponding task types,
the use levels are associated with the corresponding storage layers in multiple storage layers of the storage system based on respective current resource use statuses of the multiple storage layers,
the multiple storage layers share physical resources of the storage system, and
the priority levels of the multiple task types are based on respective historical resource use statuses of the multiple storage layers.

* * * * *